(12) United States Patent
Kessler

(10) Patent No.: US 6,518,499 B1
(45) Date of Patent: Feb. 11, 2003

(54) BOX PAD FOR MOUNTING ELECTRICAL EQUIPMENT

(75) Inventor: Seth S. Kessler, Cambridge, MA (US)

(73) Assignee: Utility Marketing Corporation, Waltham, MA (US)

( * ) Notice: Subject to any disclaimer, the term of this patent is extended or adjusted under 35 U.S.C. 154(b) by 0 days.

(21) Appl. No.: 09/927,812

(22) Filed: Aug. 10, 2001

(51) Int. Cl.[7] .............................. F16M 9/00; H05K 5/00
(52) U.S. Cl. ...................... 174/50; 174/37; 248/346.01; 248/678
(58) Field of Search ...................... 174/37, 38, 138 G, 174/138 R, 166 S, 167, 50; 411/51, 512; 403/407.1; 248/581, 621, 633, 634, 678, 519, 127, 177.1, 346.01, 346.02, 346.03, 346.4, 346.5; 336/65; 52/27, 81.5

(56) References Cited

U.S. PATENT DOCUMENTS

| | | | | |
|---|---|---|---|---|
| 3,851,607 A | * | 12/1974 | August et al. ............... | 248/678 |
| 3,962,660 A | * | 6/1976 | Duckett ...................... | 248/678 |
| 4,023,755 A | * | 5/1977 | Alesi, Jr. .................... | 248/678 |
| 4,050,659 A | * | 9/1977 | McCannon et al. ......... | 248/678 |
| 4,056,251 A | * | 11/1977 | Dixon et al. ................ | 248/678 |
| 4,186,536 A | * | 2/1980 | Piazza ........................ | 264/279 |
| 4,212,446 A | * | 7/1980 | Domanick et al. .......... | 248/678 |
| 4,505,449 A | * | 3/1985 | Turner et al. ................ | 248/678 |
| 4,783,986 A | * | 11/1988 | Koshelev .................... | 248/678 |
| 4,869,456 A | * | 9/1989 | Jacobs ........................ | 248/678 |
| 4,883,918 A | * | 11/1989 | Browning ...................... | 174/1 |
| 5,062,022 A | * | 10/1991 | Beard et al. ................ | 361/605 |
| 5,333,830 A | * | 8/1994 | Millen ........................ | 248/678 |
| 5,532,435 A | * | 7/1996 | Bolton et al. ............... | 174/135 |
| 5,573,220 A | * | 11/1996 | Whittaker et al. .......... | 248/638 |
| 5,664,394 A | * | 9/1997 | Sweeney ............... | 248/346.02 |
| 5,726,384 A | * | 3/1998 | Veermeer ...................... | 174/48 |
| 5,833,207 A | * | 11/1998 | Hagenhoff et al. ..... | 248/346.01 |
| 5,889,231 A | * | 3/1999 | Marusinec et al. ........... | 174/50 |
| 5,950,980 A | * | 9/1999 | Folmar ........................ | 248/678 |
| 5,961,093 A | * | 10/1999 | Jones et al. ............ | 248/346.01 |
| 6,044,592 A | * | 4/2000 | Strieter ........................ | 248/237 |
| 6,050,539 A | * | 4/2000 | Millen ........................ | 248/678 |
| 6,068,821 A | * | 5/2000 | VanDeGraaf ............ | 206/521.2 |
| 6,095,482 A | * | 8/2000 | LaGrotta et al. ............ | 248/678 |
| 6,152,413 A | * | 11/2000 | Gretz .......................... | 174/50 |
| 6,186,468 B1 | * | 2/2001 | Schlegel ..................... | 248/678 |
| 6,362,419 B1 | * | 3/2002 | Gallagher et al. ............ | 174/37 |
| 6,422,612 B1 | * | 7/2002 | Hays et al. ..................... | 292/5 |

* cited by examiner

*Primary Examiner*—Dean A. Reichard
*Assistant Examiner*—Adolfo Nino
(74) *Attorney, Agent, or Firm*—Iandiorio & Teska

(57) ABSTRACT

A box pad for mounting electrical equipment includes a base section, a support section adapted for mounting or enclosing electrical or utility equipment, and an inclined, corrugated wall section extending between the base and support sections.

14 Claims, 6 Drawing Sheets

BOX PAD FOR MOUNTING ELECTRICAL EQUIPMENT

FIELD OF THE INVENTION

This invention relates to a box pad for mounting electrical equipment to provide a foundation to support the weight of a transformer or to produce a vault area for electrical or other connections.

BACKGROUND OF THE INVENTION

Box pads serve as structural enclosures to support transformers and house electrical wiring for the utility industry. The principal function of the box pad is to provide a foundation to support the weight of a transformer and to produce a vault area for electrical cable connections. The box must be rigid enough to minimize deflection under the load of a transformer, durable enough to maintain its integrity through seasonally harsh environments, and safe to surrounding inhabitants. A box pad must also provide a rigid top surface for mounting and fastening electrical components. The performance criteria for box pads can be found in Northeast Underground Guideline Number 9001-87R1 "Box Pad Style Formations for Single Phase Transformers" (NEUG), and in Western Underground Guidelines (WUG), particularly the "Western Underground Committee Guide" sections 2.15 and 3.6, which are incorporated herein by reference.

Common ways of producing transformer box pads in composites include compression molding of glass preform or sheet molding compound, spray-up (with or without robotics) of glass chopped fibers, die molding of polymer resin concrete, injection molding of structural foam, and concrete.

Spray-up methods have more flexibility in production, however this process results in much more variability in fiber distribution throughout the structure. Box pads formed by spray-up methods can vary in thickness and quality. Structural foam parts have good dimensional stability but they are difficult to mold less than six millimeters thick, so volume must be compromised. Also, without reinforcing fibers, foam parts tend to creep over time. Concrete and polymer concrete products provide rigidity but are at least three times heavier than composite products.

Typical spray-up and some polymer resin concrete designs have a gel coating applied on the external surface to provide UV protection. However, if the coating is scratched or wears away the exposed material can quickly decay in normal environmental conditions. Experiments with polymer resin concrete have shown that without protection, the box pad material losses 25% of its stiffness in a period of about a year in normal sunlight. It has also been shown that this box pad material can lose over 35% of its strength in a half a year in wet and salty conditions, and suffers similar losses with certain acid exposures.

Compression molding of fiberglass with a polyester binder nets the highest glass content for the highest stiffness, and uses a closed mold yielding the most consistent wall thickness. This accuracy produces parts with much less variation in strength, stiffness, and weight. Compression molding has the additional benefits of rapid production times and permanent UV protection that is chemically introduced into the resin. Since higher production rates generate faster delivery times at a lower cost, and greater strength yields durability and longer life with less failure, compression molding is a good practice for quality parts at a reasonable price.

BRIEF SUMMARY OF THE INVENTION

It is therefore an object of this invention to provide such a box pad for mounting electrical equipment which is lightweight, strong, and which has superior bending stiffness.

It is a further object of this invention to provide such a box pad for mounting electrical equipment which is safe and durable and has uniform thickness, consistent quality, and long life.

It is a further object of this invention to provide such a box pad for mounting electrical equipment which has excellent aging properties and very good resistance to water, acid, oils, fuels and ultraviolet radiation.

It is a further object of this invention to provide such a box pad for mounting electrical equipment which can be produced and manufactured more rapidly and economically.

It is a further object of this invention to provide such a box pad for mounting electrical equipment which allows for simpler, quicker and safer installation.

It is a further object of this invention to provide such a box pad for mounting electrical equipment which provides for cost savings in the manufacturing, shipping, and installation stages.

It is a further object of this invention to provide such a box pad for mounting electrical equipment which is robust, durable and environmentally inert.

It is a further object of this invention to provide a box pad for mounting electrical equipment which meets or exceeds the NEUG and WUG guidelines.

The invention results from the realization that a stronger, lighter weight, long-lasting box pad for mounting electrical equipment which meets the NEUG and WUG guidelines, and which is more easily manufactured, shipped and installed, can be achieved with inclined, corrugated walls comprised of a lightweight material such as a thermoplastic, glass fiber composite, or other lightweight advanced composite material.

This invention features a box pad for mounting electrical equipment including a base section, a support, a support section adapted for mounting electrical equipment, and an inclined corrugated wall section extending between said base and support sections.

In a preferred embodiment, the wall section is inclined at greater than zero degrees but less than eleven degrees. The wall section may be inclined at about five degrees. The wall section or the base and support sections may be made of a glass fiber composite. The ratio of the depth of corrugation to the thickness of the wall section may be less than four to one. The corrugations may extend along the wall section from the base section toward the support section, and may extend all the way along the wall section between the base section and the support section. The corrugations may be evenly spaced about the wall section. The wall section may include four wall elements arranged in a trapezoidal configuration. The wall section may be made of a material with a specific gravity of less than 1.3, or a material with a specific gravity of less than 1.3 and with a ratio of tensile modulus to specific gravity of approximately four to one. The wall material maybe made of a binder filled with fiberglass, or a thermoplastic, glass fiber composite.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
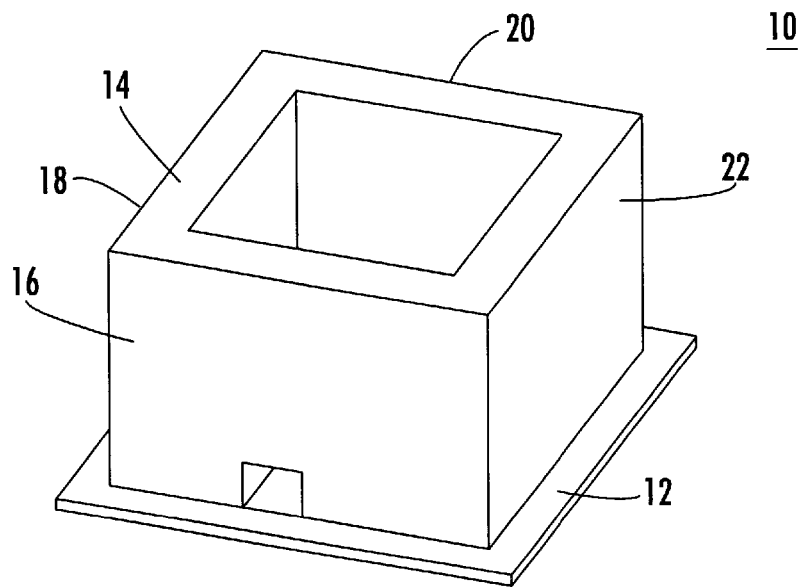
FIG. 1 is a schematic three-dimensional side view of a typical prior art box pad design.
Figure 1A:
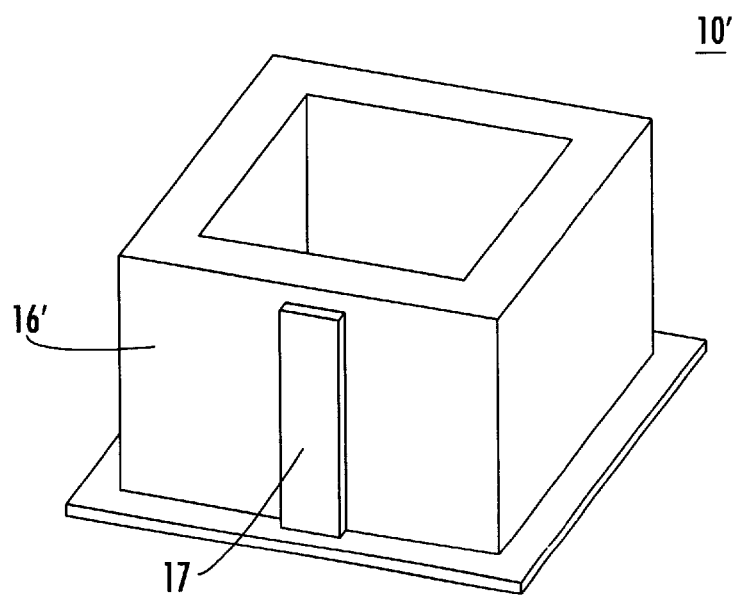
FIG. 1A is a schematic three-dimensional side view of a typical prior art box pad design with external ribs, only one side of which is shown.

There is shown in FIG. 1 a schematic view of a typical prior art box pad 10 comprised of a base and flange 12, a top 14, and four straight uncorrugated walls 16, 18, 20, 22. FIG. 1A shows a schematic view of a typical prior art box pad 10' which includes an external rib 17 on each side 16 of box pad 10' being shown.

Figure 2:
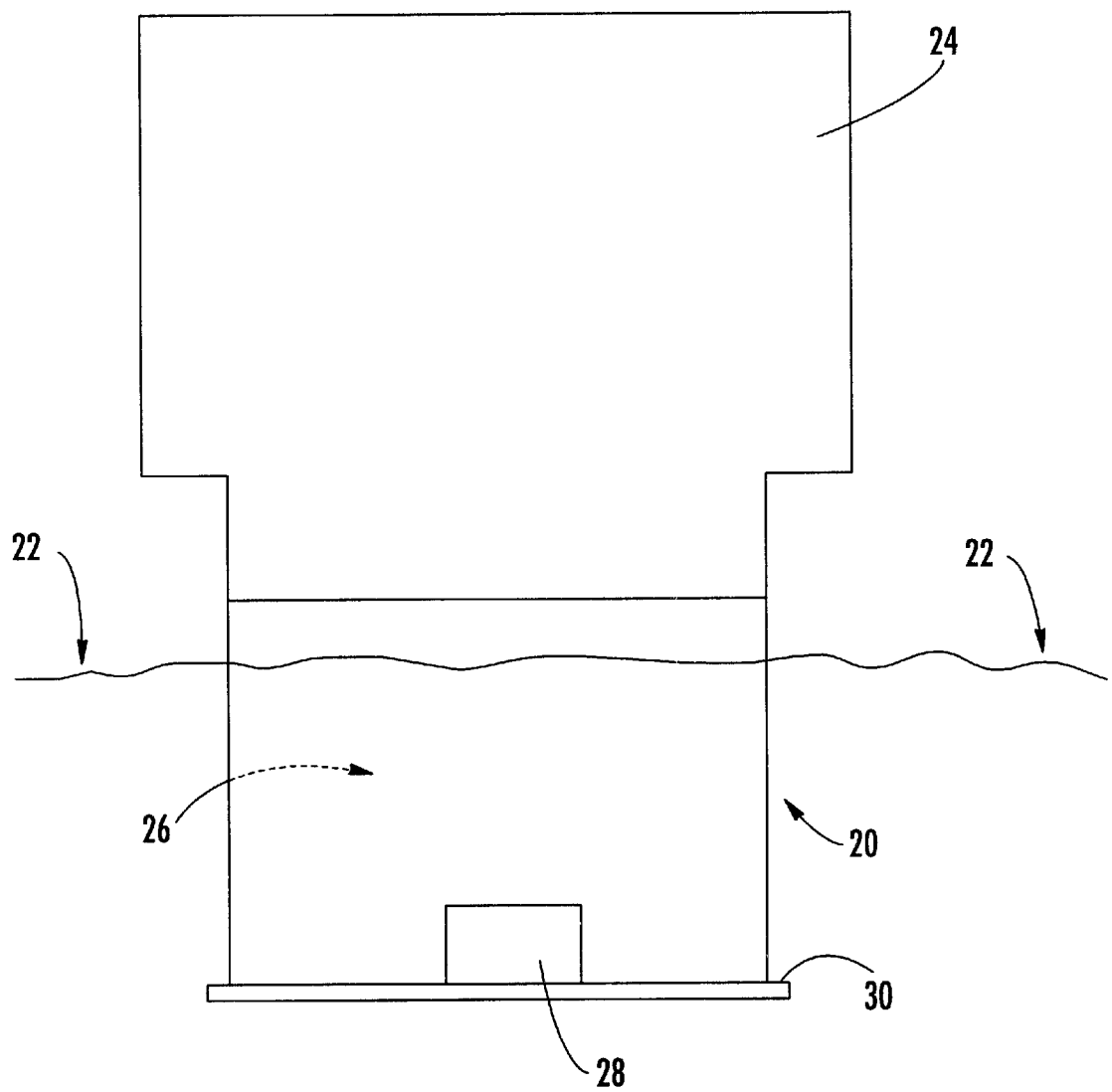
FIG. 2 is a schematic side view of a prior art box pad partially underground with a transformer on top of the box pad.

FIG. 2 shows a schematic view of a typical prior art box pad 20 in use, where it is partially under the ground 22, with a transformer 24 affixed to the top of the box pad. The box pad 20 may also provide an interior vault area 26 for electrical cable connections or electrical wiring for the utility industry. A box pad 20 typically includes one or more cable-holes 28, and a base 30.

Figure 3:
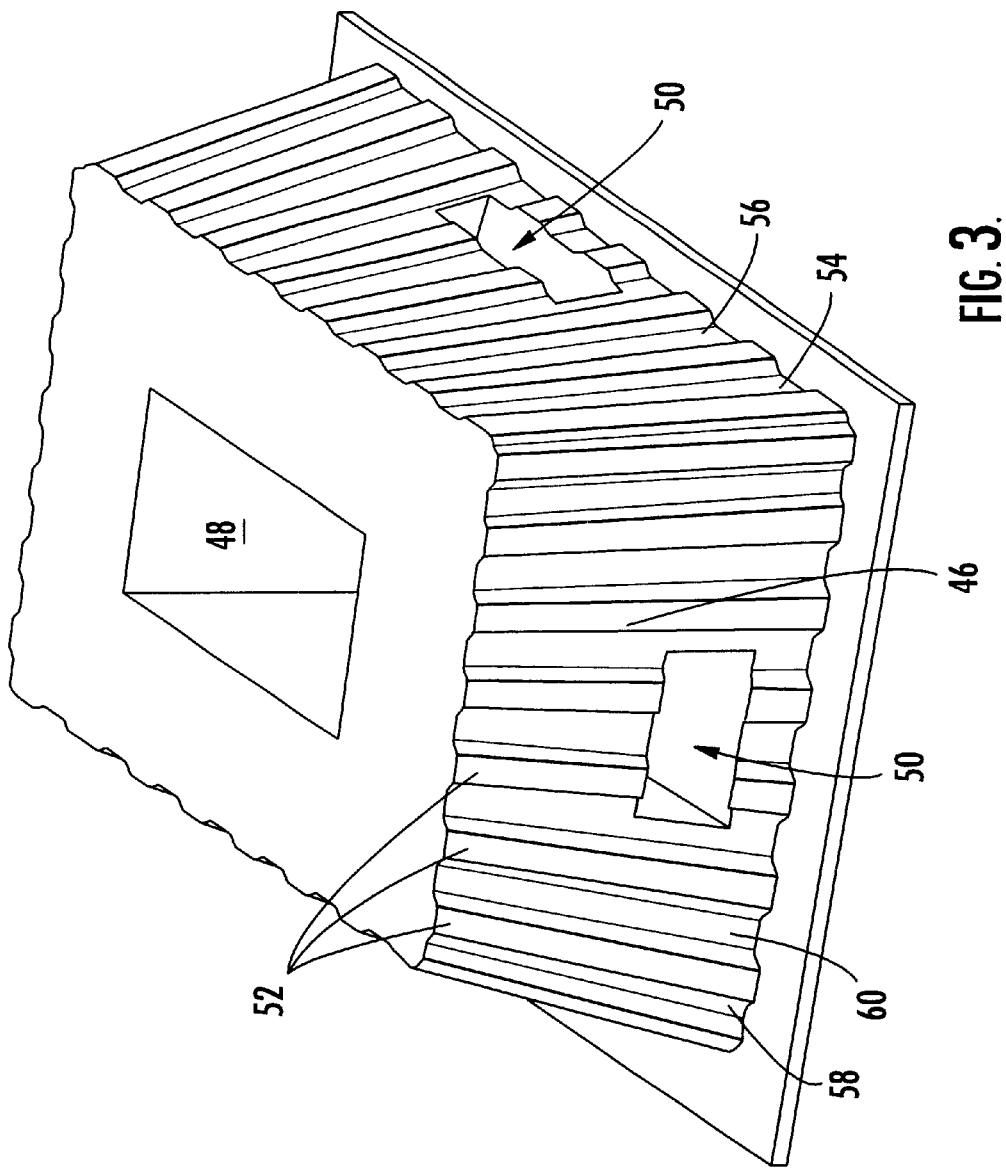
FIG. 3 is a schematic three-dimensional view of a box pad with inclined corrugated walls in accordance with the present invention.

A box pad in accordance with the present invention 40 is shown schematically in FIG. 3. Such a box pad includes a base and flange section 42, a support section 44 adapted for mounting electrical equipment such as a transformer, and an inclined corrugated wall section 46 extending between the base-section 42 and the support section 44. An interior vault area 48 may hold electrical cable connections or wiring which may be introduced into the vault through the cable-holes 50 or through the open area below the base and flange section 42.

Those skilled in the art will recognize that such a design may also hold fiber optic cables or any other power or telecommunication distribution materials or connections, electrical or non-electrical. Those skilled in the art will further recognize that the box pad may be used to support transformers, switchgears or any electrical or non-electrical object having need of support and requiring protection or isolation from environmental and physical intrusion.

Corrugations 52, FIG. 3, reduce stresses and deflections in key areas of the box. Corrugations increase the stiffness of the walls in a similar fashion to I-beams. By moving mass away from the neutral bending plane, the stiffness increases by a factor of that distance squared. With considerations to minimizing structural volume and weight, corrugation is the most efficient way to reinforce the box pad, and it is easy to form since closed molds are used for compression molding of these parts, and detailed features can be machined into the molds.

In FIG. 3, corrugations 52 are evenly spaced on the wall 46 with seven raised sections 54 and eight flange sections 56 on the longer wall, and seven raised sections 58 and six flange sections 60 on the narrower wall which extend from the base section 42 to the top support section 44.

Figure 4:
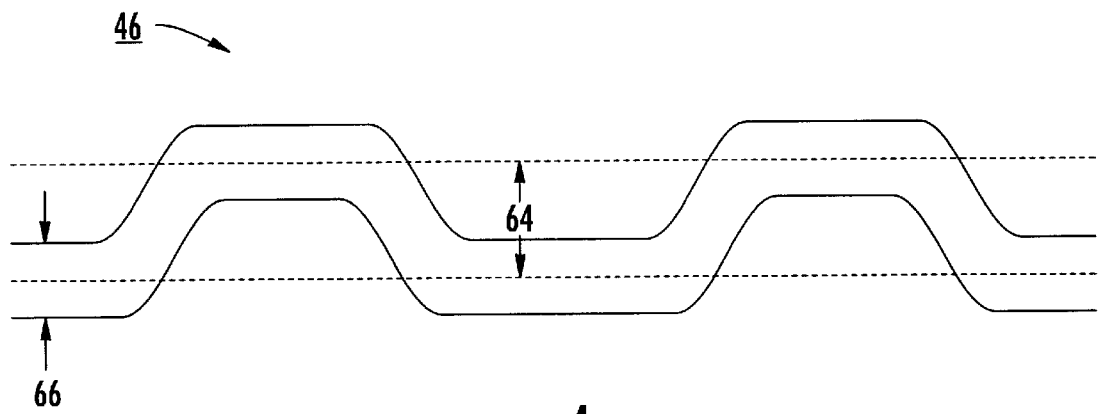
FIG. 4 is a schematic sectional view of a wall showing corrugation depth and wall thickness.

The relationship between the depth of corrugation 64 to wall thickness 66 is shown in FIG. 4 for a portion of a wall 46'. A ratio of less than four to one renders satisfactory strength and stiffness in accordance with the present invention, while a good result is obtained with a ratio of about two to one.

Figure 5:
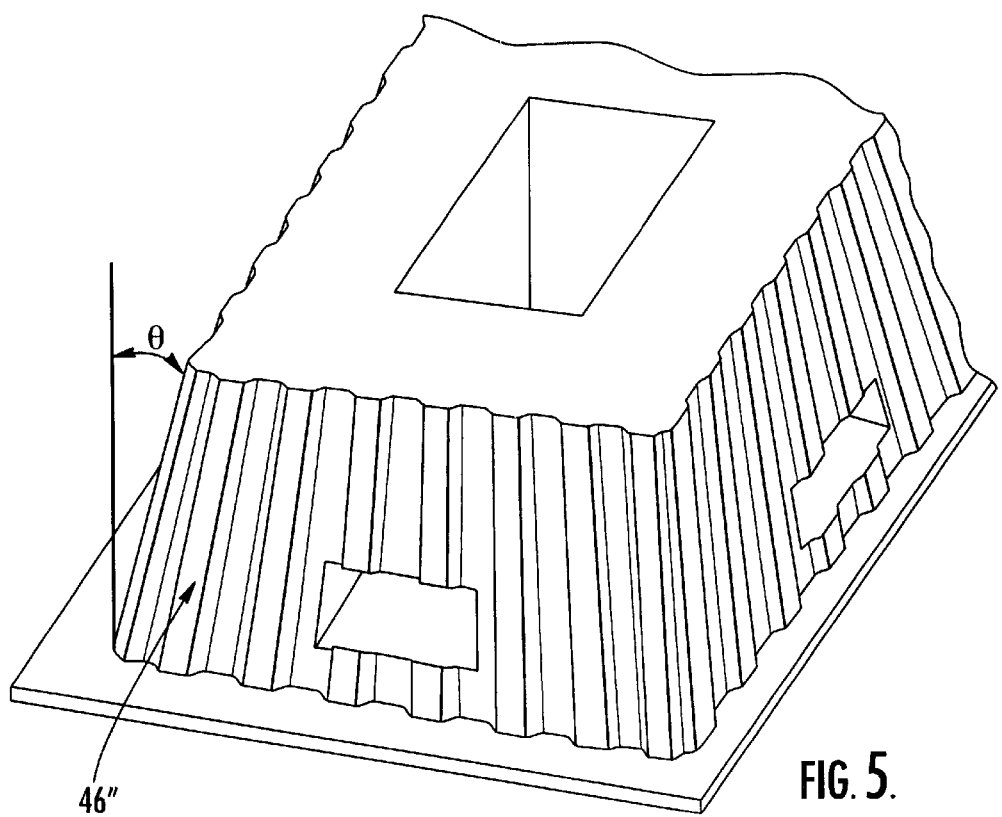
FIG. 5 is a partially broken away view showing the inclination of a wall.

An inclined corrugated wall 46" in accordance with this invention, as shown in FIG. 5, with an inclination angle θ greater than 0° but less than 11°, gives vertical and horizontal displacements with maximum deflection within the NEUG requirements, while a good result is obtained with a wall angle of about 5°.

Figure 6:
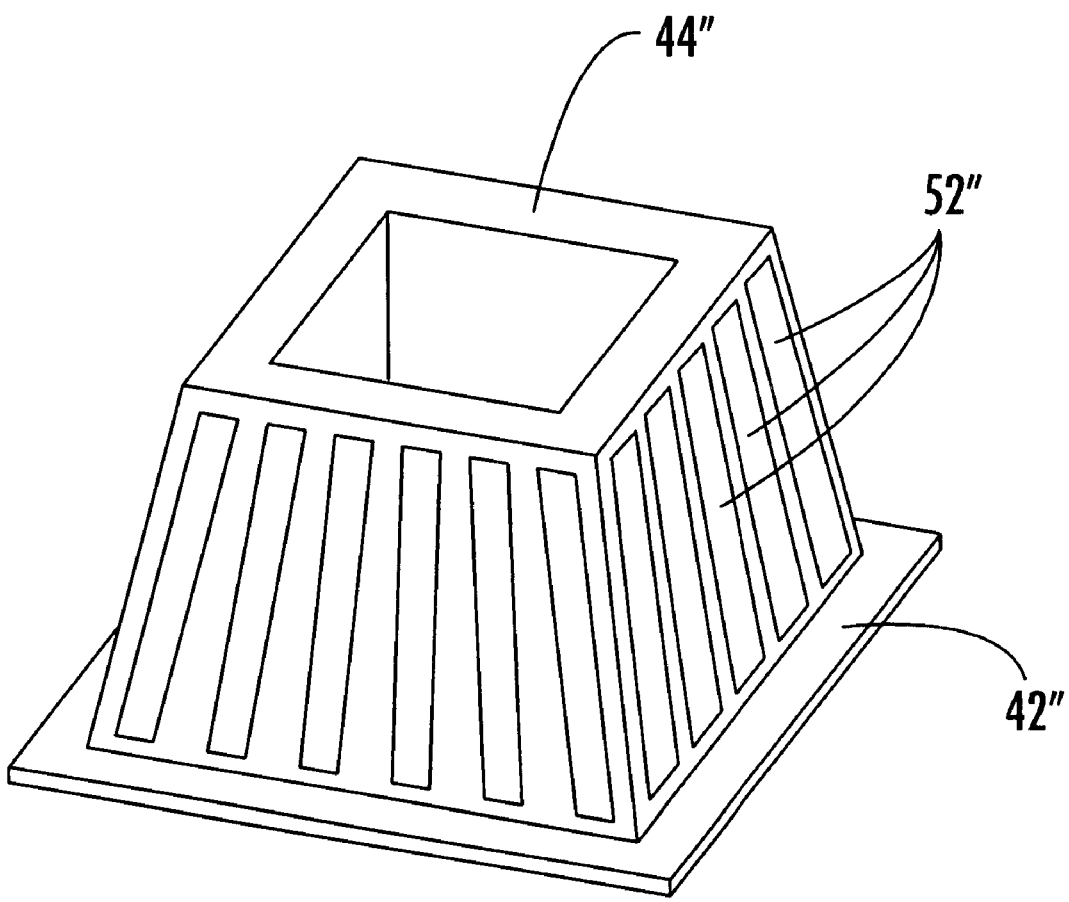
FIG. 6 is a schematic three-dimensional view of a short box pad having unevenly spaced corrugations which do not completely extend from the top support section to the base section and which are not parallel.
Figure 7:
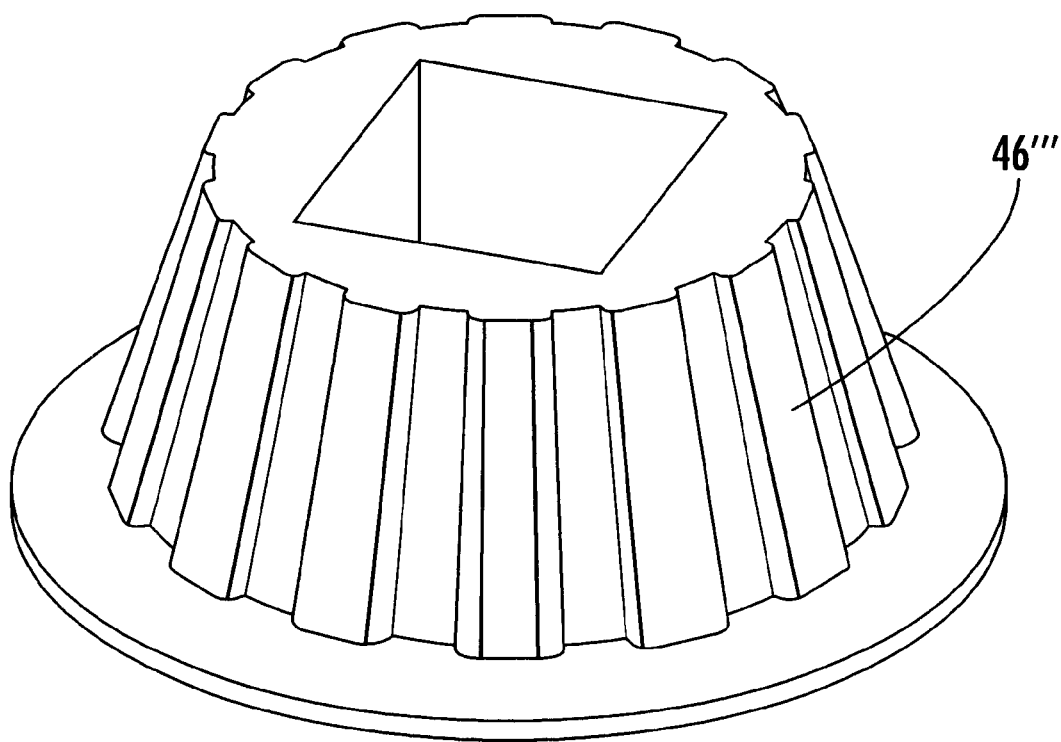
FIG. 7 is a schematic three-dimensional view showing a box pad having only one wall.

The corrugations 52" on the walls, FIG. 6, need not be evenly spaced and need not extend completely from the base section 42" to the top support section 44'". Also as shown in FIG. 6, the corrugations need not be parallel, and the number of raised sections and flanged sections need not number fifteen on the longer wall and thirteen on the narrower wall, and the box may be short. The box pad may have only one wall 46'", as shown in the circular or conical construction of FIG. 7.

The base, wall and support section may be made of a binder filled with fiberglass, a glass fiber composite, a glass filled polymer, a thermoplastic, glass fiber composite, or any lightweight material with a specific gravity of less than 1.3. One material includes a fiberglass reinforced polypropylene laminate, which is available in various fiber volumes and forms such as continuous, chopped or random. The present design has focused on chopped fiber laminates, which have improved flow into ribs due to shorter fibers and maintain a strong and lightweight part. This material has densities that are lower than traditional fiberglass laminates, and exhibits excellent energy absorbance and aging properties, as well as a very good resistance to water, acid, oils, and fuels. With chemical additives introduced during the material manufacturing process it is also UV resistant and meets the 94VO standard for flame retardancy. Extensive test data shows that even after 6 weeks exposure to 21 MPa pressure, the material maintains a creep strain of under 0.5% both at 23C and 80C. Thermoplastic molding produces products much more quickly and economically than typical composite manufacturing processes. The material cures in a closed-mold under pressure in less than a minute, and since it is at a relatively low temperature, the cycle time can be quite high. The use of matched tooling and high molding pressures assures a uniformly thick part with high tolerances. Due to the superior bending stiffness of this material, even in thin sections there is no need for fillers. However, to improve efficiency in the molding process, fillers and filled material may be used. An additional benefit of the material is that recycling scrap from one part to the next part is possible, so there is no material waste. Materials with a ratio of tensile modulus to specific gravity of approximately 4 to 1, e.g., AZDEL C401, C321 or C467 work well.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A box pad for mounting electrical equipment comprising:

a base section; a support section adopted for mounting electrical equipment; and an inclined corrugated wall section extending between said base and support sections.

2. The box pad of claim 1 in which said wall section is inclined at greater than zero degrees and less than eleven degrees.

3. The box pad of claim 1 in which said wall section is inclined at approximately five degrees.

4. The box pad of claim 1 in which said wall section is made of a glass fiber composite.

5. The box pad of claim 1 in which said base and support sections are made of a glass fiber composite.

6. The box pad of claim 1 in which the ratio of the depth of corrugation to the thickness of the wall section is less than four to one.

7. The box pad of claim 1 in which the corrugations extend along the wall section from the base section toward the support section.

8. The box pad of claim 7 in which the corrugations extend all the way along the wall section between the base section and support section.

9. The box pad of claim 1 in which the corrugations are evenly spaced about the wall section.

10. The box pad of claim 1 in which the wall section includes four wall elements arranged in a trapezoidal configuration.

11. The box pad of claim 1 in which said wall section is made of a material with a specific gravity of less than 1.3.

12. The box pad of claim 11 in which said wall section is made of a binder filled with fiberglass.

13. The box pad of claim 11 in which said wall section is made of a thermoplastic, glass fiber composite.

14. The box pad of claim 11 in which said material has a ratio of tensile modulus to specific gravity of approximately four to one.

* * * * *